United States Patent
Thorson et al.

(10) Patent No.: US 7,181,222 B2
(45) Date of Patent: Feb. 20, 2007

(54) RADIO CONFIGURATION-BASED HANDOFF PARAMETER ADJUSTMENT

(75) Inventors: Dean E. Thorson, Grayslake, IL (US); Daniel J. Declerck, Lake Barrington, IL (US); Joseph A. Tobin, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 162 days.

(21) Appl. No.: 11/026,379

(22) Filed: Dec. 30, 2004

(65) Prior Publication Data

US 2006/0148480 A1  Jul. 6, 2006

(51) Int. Cl.
*H04Q 7/20* (2006.01)
*H04Q 7/38* (2006.01)

(52) U.S. Cl. .................. 455/442; 455/436; 455/422.1; 455/437; 455/438; 455/440; 455/426.1; 455/426.2; 370/331; 370/332; 370/333; 370/334

(58) Field of Classification Search ........ 455/436–437, 455/438, 439, 440, 441, 442, 443, 444, 445, 455/422.1, 426.1, 426.2, 403, 412.1, 412.2, 455/432.1, 432.2, 432.3, 500, 517, 550.1, 455/414.1, 414.3, 414.2; 370/331, 332, 333, 370/334

See application file for complete search history.

(56) References Cited

U.S. PATENT DOCUMENTS

| | | | |
|---|---|---|---|
| 2002/0037726 A1* | 3/2002 | Czaja et al. ................ | 455/442 |
| 2002/0105927 A1* | 8/2002 | Holma et al. ............... | 370/331 |
| 2003/0060201 A1* | 3/2003 | Soliman ..................... | 455/442 |
| 2004/0185863 A1* | 9/2004 | Ogami ..................... | 455/452.1 |
| 2005/0096055 A1* | 5/2005 | Colban et al. ............. | 455/442 |
| 2006/0111108 A1* | 5/2006 | Newbury et al. .......... | 455/436 |

* cited by examiner

*Primary Examiner*—Keith Ferguson

(57) ABSTRACT

A method and apparatus facilitate soft handover in a CDMA RAN (100) based on a requested set of soft handover parameters from a plurality of sets of soft handover parameters associated with a corresponding plurality of radio configurations. A mobile station (140) can request a set of soft handover parameters associated with a radio configuration. Candidate base stations (BTS 1–BTS N) can be added to an active list based on the soft handover parameters.

18 Claims, 5 Drawing Sheets

-PRIOR ART-

-PRIOR ART-

RADIO CONFIGURATION-BASED HANDOFF PARAMETER ADJUSTMENT

FIELD OF THE INVENTION

The present invention relates in general to wireless communication systems, and more specifically to a method and apparatus for facilitating soft handovers between cells in a wireless cellular communication system.

BACKGROUND OF THE INVENTION

In modern Code Division Multiple Access (CDMA) systems soft handover or handoff is a preferred method for transferring support for a mobile communication unit from one base station to another as the communication unit moves between cells within, for example, a Radio Access Network (RAN). Since CDMA systems use the same frequencies between cells it is possible to make new connections with base stations while existing connections are maintained reducing power requirements, interference and the like and decreasing the probability of a dropped call.

In making handoffs or handovers, the communication unit maintains what is referred to as an Active Set associated with base stations to which service for the call in progress can be transferred if certain handoff parameters are met based on measurements of pilot signals from various base stations within range. The measurement process is ongoing and the handoff parameters include pilot strength thresholds that cause, for example, the base station to be added to the Active Set or dropped from the Active Set. In conventional systems, the handoff parameters typically used to allocate channels are provided to the mobile on the basis of a single RC, typically RC1 which is used throughout the RAN regardless of whether or not different radio configurations are possible. For example, for CDMA2000 or IS-2000 based RANs a multitude of RCs are available. Disadvantageously however, in CDMA2000 or IS-2000 systems, handoff parameters are set system-wide as noted based on, for example, RC1 and are the same regardless of the existence of the additional radio configurations.

It should be appreciated by one of ordinary skill in the art that handoff performance depends on link budget. Further, link budget performance of a RC in a CDMA2000 or IS-2000 system varies depending upon prevailing conditions and, for example, the type of modulation and coding applied for a particular RC. For example, in a typical CDMA2000 or IS-2000 system, RC2 has less channel gain than RC1 by 1.8 dB. Other RCs have divergent gains, with some RCs having more and some having less. It will be appreciated that higher channel gain requires less Ec/Io for adequate demodulation and thus some RCs may have gains particularly well suited for demodulation.

However, since as noted, in CDMA2000 or IS-2000 systems, handoff parameters are set system-wide based on a standard RC such as RC1, the ability to operate using handoff parameters associated with other, often more optimum radio configurations, is limited leading to, for example, limited Active Set candidacy for base stations which might otherwise be more desirable candidates than candidates chosen based on handoff parameters associated with the standard RC.

BRIEF DESCRIPTION OF THE DRAWINGS

The accompanying figures, where like reference numerals refer to identical or functionally similar elements and which together with the detailed description below are incorporated in and form part of the specification, serve to further illustrate exemplary embodiments and to explain various principles and advantages in accordance with the present invention.

DETAILED DESCRIPTION

Figure 1:
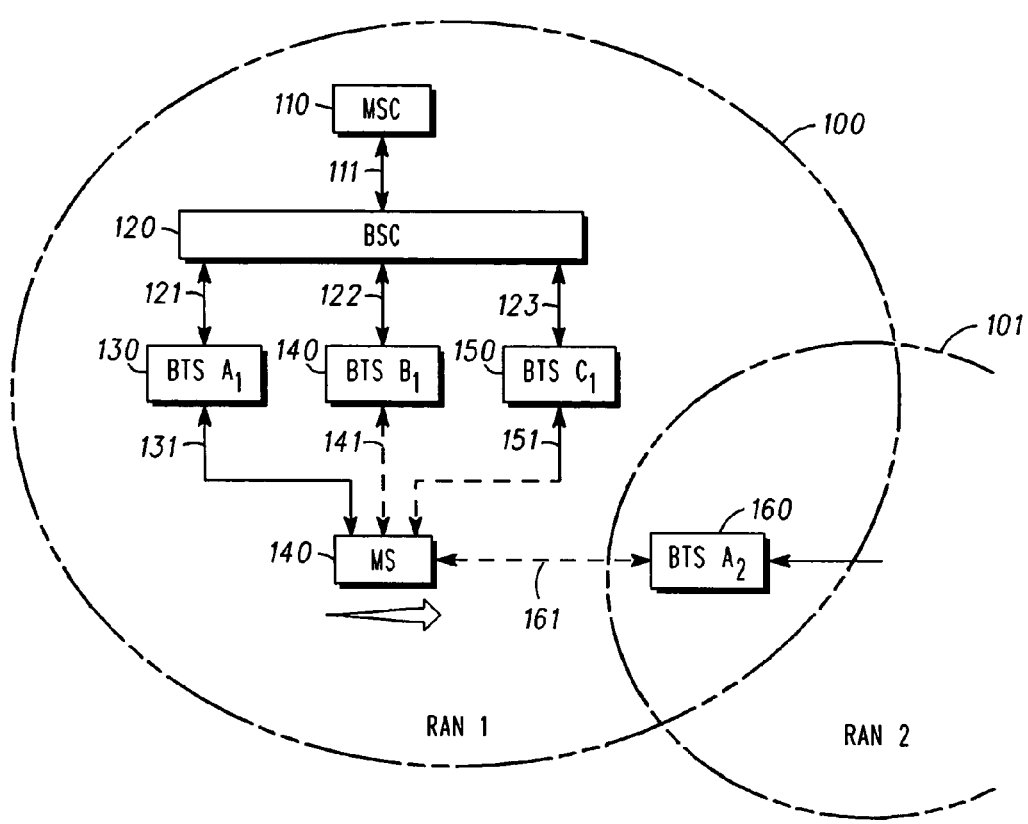
FIG. 1 is a diagram illustrating an exemplary Radio Access Network (RAN) and mobile communication unit in accordance with various exemplary embodiments.

In overview, the present invention relates to facilitating soft handoffs or handovers in cellular communications between devices or units, often referred to as wireless communication units, such as cellular telephone or two-way radio handsets and the like and one or more candidate base stations. More particularly, various inventive concepts and principles are embodied in cellular communication systems, infrastructure components, communication devices, and methods therein for performing soft handoffs or handovers. It should be noted that in addition to connoting a typical handset, the term communication unit may be used interchangeably with mobile station, subscriber unit, wireless subscriber unit, wireless subscriber device or the like. Each of these terms denotes a device ordinarily associated with a user and typically a wireless mobile device that may be used with a public network or within a private network such as an enterprise network. Examples of such units include personal digital assistants, personal assignment pads, and other portable personal computers equipped for wireless operation, a cellular handset or device, or equivalents thereof provided such units are arranged and constructed for measuring pilot signal power levels and establishing lists of active and/or candidate base stations and the like.

The present description is provided to further explain, in an enabling fashion, exemplary modes of performing one or more embodiments of the present invention. The description is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

In addition to devices of a general nature, the communication devices of particular interest are those providing or facilitating voice/data communications services over cellular wide area networks (WANs), such as conventional two way systems and devices, various cellular phone systems including analog and digital cellular, CDMA (code division multiple access) and variants thereof such as CDMA2000 or IS-2000, 1X EV-DO (1X Evolution Data Optimized), 1X EV-VD (1X Evolution Data Voice), GSM, GPRS (General Packet Radio Service), 2.5G and 3G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof. Furthermore the wireless communication units or devices of interest can have short range wireless communications capability normally referred to as WLAN capabilities, such as IEEE 802.11, Bluetooth, or Hiper-Lan and the like preferably using CDMA, frequency hopping, OFDM or TDMA access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication units or devices of interest may be connected to a LAN using protocols such as TCP/IP, UDP/UP, IPX/SPX, or Net BIOS via a hardwired interface such as a cable and/or a connector.

As further discussed herein below, various inventive principles and combinations thereof are advantageously employed to provide an exemplary method as might be used in a RAN for facilitating the transfer of handoff parameters associated with a handoff of a call. The call includes a wireless communication unit and the handover can be from a first base station to a second base station in the RAN. Accordingly a base station can be notified of one of several radio configurations chosen for operation by the wireless communication unit for use during the call. It will be appreciated that notification can be performed during a call setup procedure associated with the call or during a hard handover or the like. The plurality of radio configurations further has a corresponding plurality of sets of handoff parameters to allow base stations to be added and dropped from the Active Set. An exemplary communication unit such as a mobile station can receive one of the plurality of sets of handoff parameters associated with the chosen radio configuration which can be transferred, for example, from the first base station.

In accordance with other exemplary embodiments, an apparatus is provided for facilitating a call handoff involving a wireless communication unit in a CDMA RAN such as in accordance with CDMA 2000 or IS 2000 or the like. In accordance with an exemplary minimal configuration, the exemplary apparatus can include an RF interface for coupling to the CDMA RAN, such as over an air interface, a memory, and a processor. Using software configurations as are common in the art, the processor can be configured to maintain a set of soft handover parameters for each of a plurality of radio configurations associated with the CDMA RAN. A notification can be received, for example, over the RF interface of a chosen one of the plurality of radio configurations chosen for operation by the wireless communication unit. In response, the processor can be configured to transfer a set of soft handover parameters corresponding to the selected radio configuration to the wireless communication unit over the RF interface.

An exemplary environment including a RAN 1 100 is shown in FIG. 1. A wireless communication unit such as a Mobile Station (MS) 140 during operation can move within the RAN 1 100 and even outside the RAN 1 100, for example to a RAN 2 101. In moving during operation, handoffs or handovers can take place between the MS 140 and a BTS $A_1$ 130, a BTS $B_1$ 140, and a BTS $C_1$ 150, forming a link 131, a link 141, and a link 151 respectively there between during operation. The BTS $A_1$ 130, the BTS $B_1$ 140, and the BTS $C_1$ 150 can further be connected respectively through a link 121, a link 122, and a link 123 to a Base Station Controller (BSC) 120 which is connected to Mobile Switching Center (MSC) 110 through a link 111. For handovers outside the RAN 1 100, for example, to the RAN 2 101, the MS 140 can connect to a BTS $A_2$ 160 through a link 161.

Figure 2:
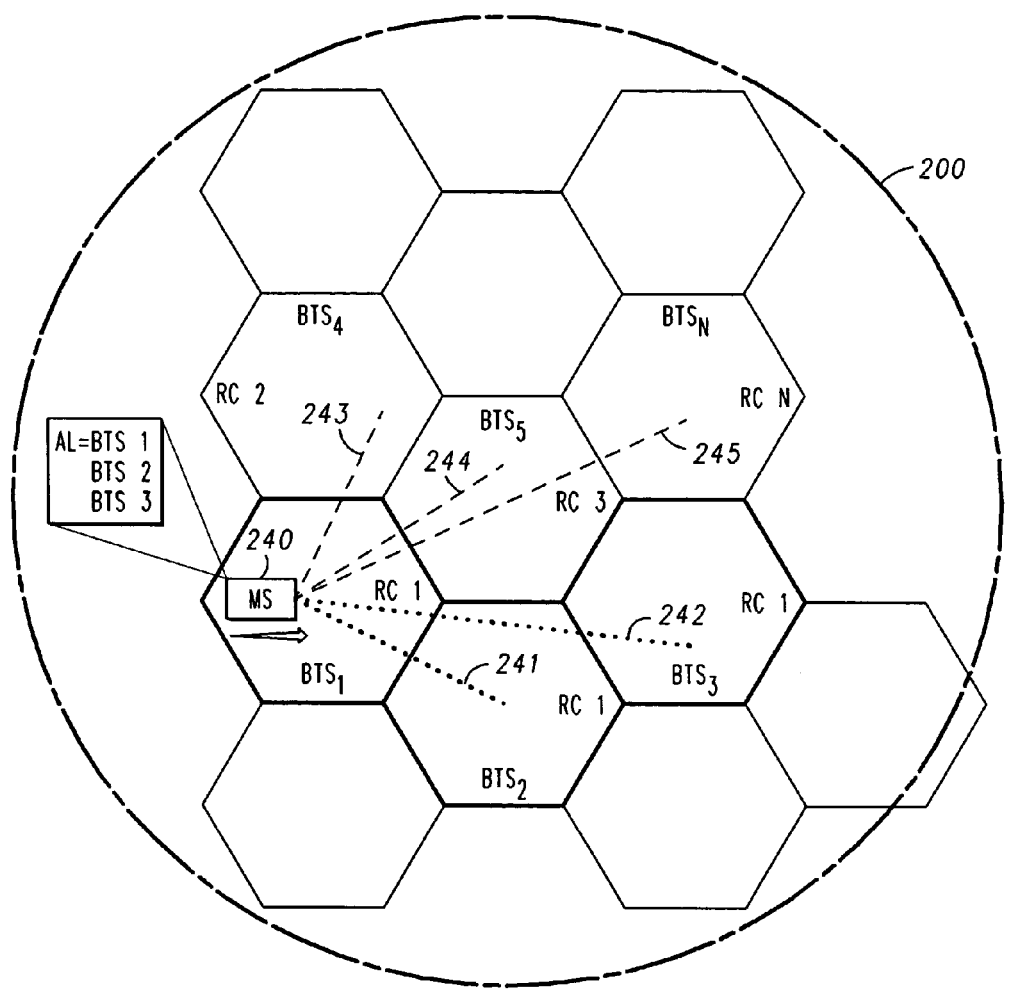
FIG. 2 is a diagram illustrating an exemplary prior art handoff scenario with one set of handoff parameter applied across an exemplary RAN.

To better understand conventional operation, a conventional RAN, such as a RAN 200 is shown in FIG. 2 having exemplary cells associated with base stations, such as a $BTS_1$–a $BTS_N$. A wireless communication unit such as a MS 240 can connect with, for example, with the $BTS_1$ during a call set up in a manner known in the art, at which point the standard handoff parameters are passed to the MS 240 from the $BTS_1$ associated with a standard radio configuration such as, for example, RC1. It can be seen that based on the handoff parameters associated with RC1, only the $BTS_2$ and the $BTS_3$ will qualify as candidates for handoff, for example, on handoff links 241 and 242. Thus, when the MS 240 is limited to handoff parameters associated only with RC1, the Active List will contain only the $BTS_1$, the $BTS_2$, and the $BTS_3$. Thus the $BTS_4$, the $BTS_5$, and the $BTS_N$ will not be added even though the corresponding radio configurations, such as RC2, RC3, and RCN may provide better operation. In situations where a particular Quality of Service (QoS) level is required to support specialized services such as real time data services or the like, the limitations posed by limiting the handoff parameters to the standard RC can be particularly burdensome.

Figure 3:
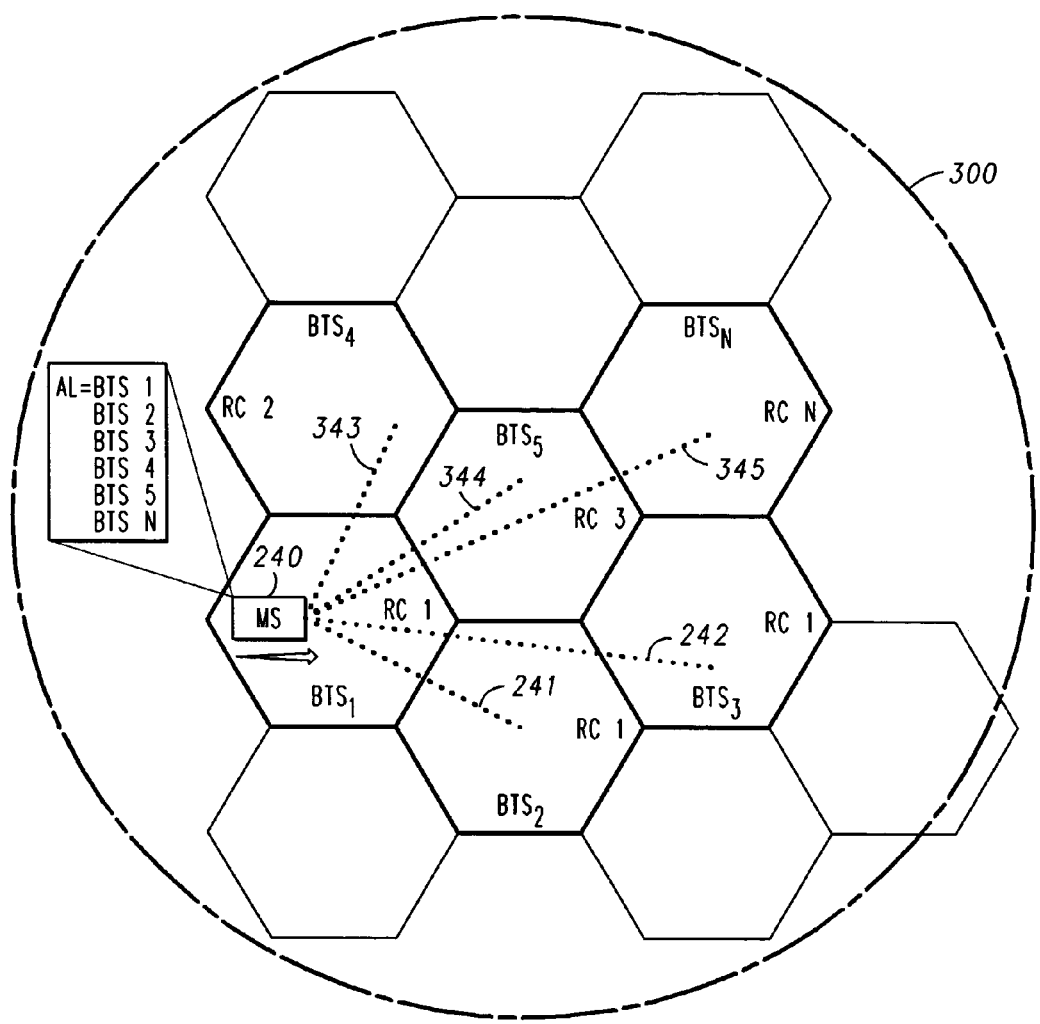
FIG. 3 is a diagram illustrating an exemplary handoff scenario with a plurality of handoff parameters applied across an exemplary RAN in accordance with various exemplary embodiments.

Therefore, in accordance with various exemplary embodiments, as shown for example in FIG. 3, an exemplary RAN such as a RAN 300 can be configured such that the MS 240 can be provided with a greater opportunity to obtain handoff parameters more closely matched to its particular service needs contrary to what is presently possible in conventional systems, for example as described above. The MS 240 can connect, for example, with the $BTS_1$ during a call set up in a manner known in the art, at which point while the standard handoff parameters may be passed to the MS 240 from the $BTS_1$ associated with a standard radio configuration such as, for example, RC1, a set of handoff parameters associated with a chosen or selected radio configuration may instead be provided to the MS 240. As in the description above, if RC1 is chosen or selected, or if no RC is chosen or selected, handoff parameters associated with RC1 can be sent to the MS 240. Based on the handoff parameters associated with RC1, the BTS$_2$ and the BTS$_3$ will qualify for as candidates for handoff, for example, on the handoff links 241 and 242.

If the MS 240 notifies BTS$_1$ that one of potentially several radio configurations other than RC1 has been chosen for operation by the MS 240 for use during the call, for example during a call setup procedure or during a hard handover or the like, then a set of handoff parameter can be provided to the MS 240 to allow base stations operating in accordance to the chosen radio configuration to be added and dropped from the Active Set. It will be appreciated that in accordance with the particular system, such as a CDMA 2000, IS 2000 system or the like, 10 or more different radio configurations may be possible.

For example, if the MS 240 notifies the BTS$_1$ that RC 2 has been chosen as the radio configuration, the BTS$_4$ can be added to the Active List. If the MS 240 notifies the BTS$_1$ that RC3 has been chosen as the radio configuration, the BTS$_5$ can be added to the Active List. If the MS 240 notifies the BTS$_1$ that RCN has been chosen as the radio configuration, the BTS$_N$ can be added to the Active List. It will further be appreciated that in some circumstances, as the MS 240 receives handoff parameters associated with different radio configurations, the handoff parameters can be stored such that a plurality of handoff parameters can be available for the MS 240 to use during handoffs. Thus base stations operating in accordance with the corresponding radio configurations, such as RC2, RC3, and RCN may be chosen and used to provide more optimal modulation for particular Quality of Service (QoS) levels required, for example, to support specialized services such as real time data services or the like, as noted above.

Figure 4:
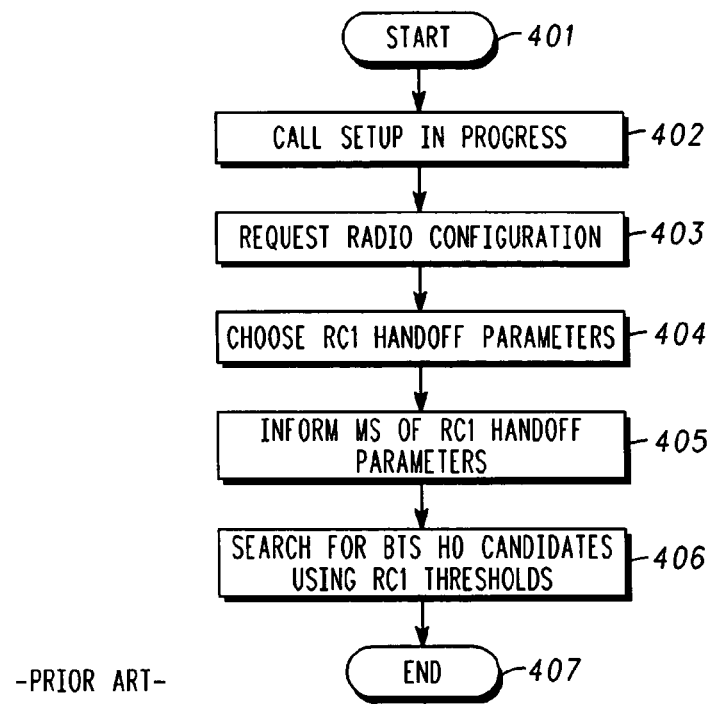
FIG. 4 is a flow chart illustrating an exemplary prior art procedure for determining handoff parameters.

Further in accordance with conventional operation, a flow chart is shown in FIG. 4 which represents conventional transfer of handoff parameters. After start at 401, a call set up can be in progress at 402 where an MS is attempting to originate a call through a particular base station. At 403 the MS can request a radio configuration. As noted above, the base station in a conventional environment will choose the standard, or RC1 handoff parameters at 404. The MS will be informed of the RC1 handoff parameters at 405. In accordance with known procedures, the MS will then search for BTS candidates at 406 using the handoff parameters such as the threshold for adding a BTS to the Active List at 406. The conventional procedure then ends at 407. The procedure will be repeated only during a new call set up since the MS will continue to use the RC1 handoff parameters for the remainder of the call, even during hard or soft handovers leading to the disadvantages noted above.

Figure 5:
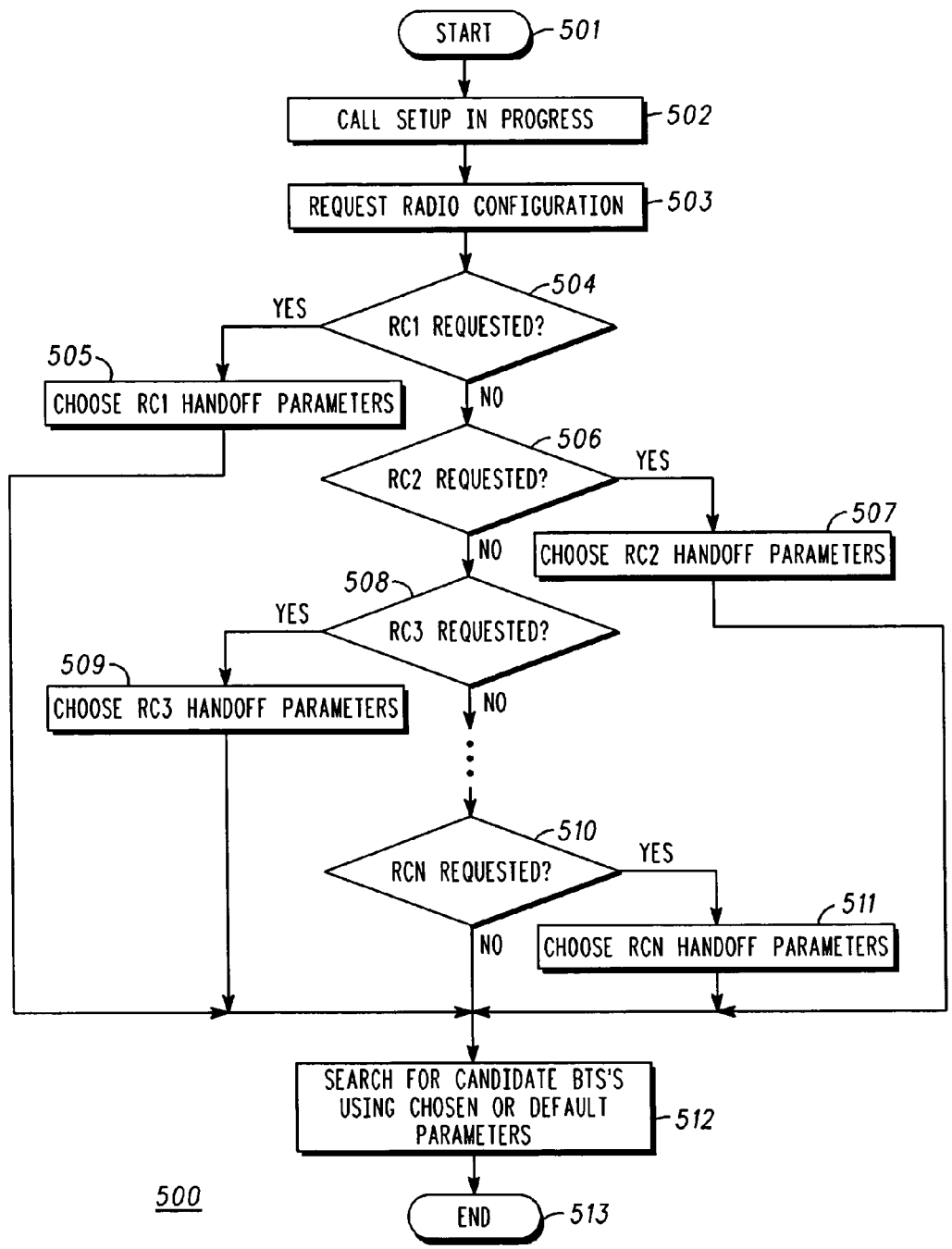
FIG. 5 is a flow chart illustrating an exemplary procedure for determining handoff parameters in accordance with various exemplary embodiments.

In contrast, an exemplary procedure 500 in accordance with various exemplary embodiments is shown in FIG. 5. After start at 501, a call set up or a related operation, such as a hard handover or the like will be in progress at 502. During call set-up, hard handover, or the like, the MS will request a particular radio configuration at 503 which it knows to be in line with the services required. For example, if the MS needs real time data services sufficient to support a multimedia session it may request a particular radio configuration optimized for multimedia operation. If RC1 is requested at 504, the serving BTS can choose the RC1 handoff parameters at 505 which are then sent on the downlink to the MS and candidate BTSs can be searched for at 512 which fit the handoff parameters associated with RC1. If RC2 is requested at 506, the serving BTS can choose the RC2 handoff parameters at 507 which are then sent on the downlink to the MS and candidate BTSs can be searched for at 512 which fit the handoff parameters associated with RC2. If RC3 is requested at 508, the serving BTS can choose the RC3 handoff parameters at 509 which are then sent on the downlink to the MS and candidate BTSs can be searched for at 512 which fit the handoff parameters associated with RC3. If RCN is requested at 510, the serving BTS can choose the RCN handoff parameters at 511 which are then sent on the downlink to the MS and candidate BTSs can be searched for at 512 which fit the handoff parameters associated with RCN.

It will be appreciated that, given the known link budget differences between radio configurations, the handoff parameters such as T_ADD, T_DROP, T_COMP, and T_TDROP and the like can be assigned different values that optimize handoff performance for each radio configuration. Since the radio configuration typically tends to remain static during a session, the handoff parameters would generally apply to a complete call. It will further be appreciated that any updated handoff parameters can be passed to the MS in a Handoff Message. An infrastructure component, such as the BTS must maintain a standard set of handoff parameters per radio configuration including values for parameters such as threshold values for: T_ADD, T_DROP, T_COMP, and T_TDROP.

The parameters T_ADD, T_DROP, T_COMP, and T_TDROP$_n$ are used to control the dynamic response or behavior of the handoff algorithm. As will be appreciated by one of ordinary skill, T_ADD and T_DROP are threshold values against which the power spectral density of a pilot signal, or its energy per chip, Ec, is measured relative to the total power spectral density NoT. In an exemplary RAKE receiver, if more than one RAKE-receiver fingers is available, the sum of the Ec/NoT ratios on the multipath components to be processed by the RAKE-receiver fingers is used as a measure of the pilot strength. It should further be noted that T_COMP is a ratio of the value of Ec/NoT for a pilot in the candidate set to the value of Ec/NoT for a pilot in the active set, and T_TDROP is a time interval used to help avoid deleting a weak pilot from the active set simply because it is in a momentary deep fade.

In brief summary, the four handoff parameters noted above can be more specifically defined as follows: T_ADD is the threshold value of Ec/NoT at which a pilot is moved into the candidate set, usually from the neighbor set; T_COMP is the threshold value of the ratios of Ec/NoT at which a pilot in the candidate set appears to be worthy of being promoted to the active set; T_DROP, threshold value of Ec/NoT at which a counter is started to determine if that pilot should be removed from the active set; and T_TDROP is the drop-timer threshold interval which is the threshold of time beyond which a pilot with Ec/NoT below T_DROP is removed from the active set.

In a typical traffic mode, T_ADD, T_COMP, T_DROP, and T_TDROP are used as follows. If the Ec/NoT measured at the mobile for a particular pilot exceeds T_ADD, that pilot is moved to the candidate set and a Pilot Strength Measurement Message (PSMM) is transmitted to the current base stations. If the Ec/NoT measured for a pilot in the candidate set exceeds the Ec/NoT measured for a pilot in the active set by more than a factor of T_COMP times 0.5 dB, then the mobile sends a PSMM, but it does not unilaterally move the pilot from the candidate set into the active set. Movement of the pilot into the active set occurs by direction contained in the Handoff Direction Message. In some instances the use of T_COMP is not favored, at least in part because it slows down the movement of the pilots into the active set. If the Ec/NoT measured at the mobile for a pilot in the active set is below T_DROP, the pilot is not immediately removed from the active set. Instead, the drop timer is started at which point if a later measurement of Ec/NoT on this pilot yields a value above T_DROP before the timer "times out" by reaching T_TDROP, the drop timer is stopped and reset to zero. If the drop timer counts up to T_TDROP seconds, indicating that the pilot has been below T_DROP for an interval of time equal to T_TDROP, the mobile sends a PSMM to the current base stations. The mobile only removes this pilot from the active set by direction contained in the Handoff Direction Message (HDM).

It should generally be appreciated that increasing T_ADD and T_COMP makes it more difficult for a pilot associated with a BTS to qualify for inclusion in the active set resulting in slowing of the addition of candidates. Decreasing T_ADD and T_COMP increases the speed at which candidates are added. By decreasing T_ADD and increasing T_COMP, it becomes easier for candidates to be added, but more difficult to be promoted to the active set. Similarly, by decreasing T_DROP and increasing T_TDROP pilots can be retained longer in the active set. Increasing T_DROP and decreasing T_TDROP pilots are removed from the active set more rapidly. Under some circumstances, where T_ADD and T_DROP are sufficiently increased and T_COMP and T_TDROP are sufficiently decreased the active set size may be no greater than one (1). These circumstances essentially disable soft handoff or diversity.

In addition to the handoff parameters of T_ADD, T_COMP, T_DROP, and T_TDROP, additional handoff parameters are contemplated for use in accordance with various exemplary and alternative exemplary embodiments. For example the parameters SOFT_SLOPE, ADD_INTERCEPT, and DROP_INTERCEPT may be used in connection with particular radio configurations to establish when a particular BTS can be added as a candidate or added to the Active Set. For a more complete appreciation of handoff parameters see, for example, "Upper Layer Signaling Standard for cdma2000 Spread Spectrum Systems" document 3GPP2 C.S0005. It will be appreciated that the handoff parameters were originally intended to be used to track a pilot channel's signal to noise ratio, however have not taken into account the growing number of radio configurations available.

Figure 6:
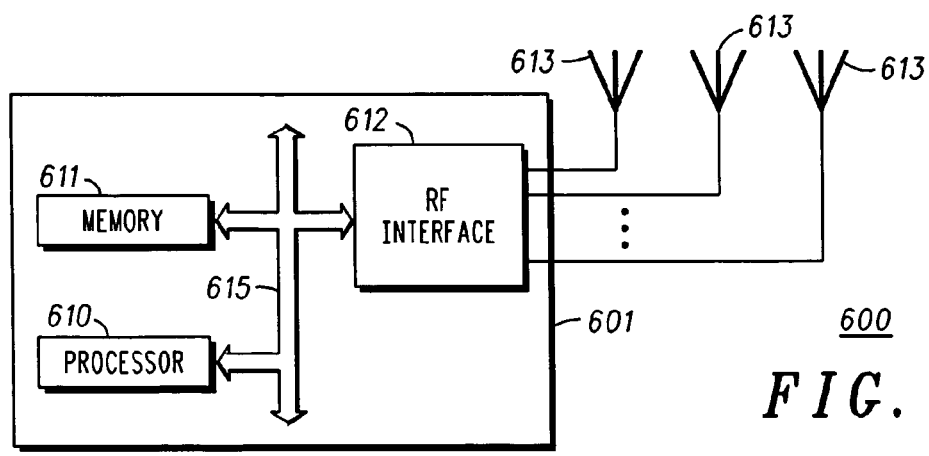
FIG. 6 is a block diagram illustrating components of an exemplary apparatus in accordance with various exemplary and alternative exemplary embodiments.

In accordance with still other exemplary and alternative exemplary embodiments, the present invention can be implemented in accordance with an exemplary apparatus such as an apparatus 600 shown in FIG. 6. In a minimal configuration, a device 601 which can be an infrastructure component or the like, can include a processor 610, a memory 611, an RF interface 612, all of which may be connected using a bus 615 or the like. As will be appreciated, a majority of the present invention in some embodiments can be implemented to a large degree in software, where much of the radio specific circuitry and the like are contained within the RF interface 612. Thus signals such as signals received on one or more antennas 613, can be received by the device 601 associated with, for example, the notification of a particular radio configuration which has been selected by an MS to which the device 601 is communicatively coupled through an air interface or the like. The processor 610 can maintain a set of handoff parameters for each of a plurality of radio configurations, for example, in the memory 611 which handoff parameters can be sent based on which radio configuration is chosen by the MS. It will be appreciated that in order to accomplish such procedures, the processor 610 must be of sufficiently high speed to process signals at or near the rate at which information is received. Thus the processor 610, as will be appreciated, can be a high speed general purpose processor matched in transfer speed to the bus 615 and access speed of the memory 611, or can be a dedicated or special purpose processor, or the like, while still maintaining sufficient speed to properly match capabilities with the bus 615 and the memory 611.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for facilitating the transfer of handoff parameters associated with a handoff of a call including a wireless communication unit from a first base station to a second base station in a Radio Access Network (RAN), the method comprising:
   notifying the first base station of a chosen one of a plurality of radio configurations chosen for operation by the wireless communication unit for use during the call, the notifying performed during a call setup procedure associated with the call; the plurality of radio configurations having a corresponding plurality of sets of handoff parameters associated therewith; and
   receiving a first one of the plurality of sets of handoff parameters associated with the chosen one of the plurality of radio configurations transferred from the first base station to the wireless communication unit.

2. A method in accordance with claim 1, further comprising:
   notifying the first base station of a chosen different one of the plurality of radio configurations chosen for operation by the wireless communication unit for use during the call after a radio configuration change, the notifying performed during a hard handover procedure associated with the call; and
   receiving a second one of the plurality of sets of handoff parameters associated with the chosen different one of the plurality of radio configurations transferred from the first base station to the wireless communication unit.

3. A method in accordance with claim 2, further comprising:
   notifying the first base station of an additional chosen different one of the plurality of radio configurations chosen for operation by the wireless communication unit for use during the call after an additional radio configuration change, the notifying performed during an additional hard handover procedure associated with the call; and
   receiving a third one of the plurality of sets of handoff parameters associated with the additional chosen different one of the plurality of radio configurations transferred from the first base station to the wireless communication unit.

4. A method in accordance with claim 2, wherein the second one of the plurality of sets of handoff parameters includes one or more of: a T_ADD threshold, a T_DROP threshold, a T_COMP threshold a T_TDROP threshold, a SOFT_SLOPE threshold, an ADD_INTERCEPT threshold, and a DROP_INTERCEPT threshold.

5. A method in accordance with claim 1, wherein the first one of the plurality of sets of handoff parameters includes one or more of: a T_ADD threshold, a T_DROP threshold, a T_COMP threshold a T_TDROP threshold, a SOFT_SLOPE threshold, an ADD_INTERCEPT threshold, and a DROP_INTERCEPT threshold.

6. A method in accordance with claim 1, wherein the plurality of radio configurations includes 10 different radio configurations.

7. A method in accordance with claim 1, wherein the RAN includes a CDMA2000 RAN.

8. A method for facilitating the transfer of handoff parameters associated with a soft handover of a call including a wireless communication unit in a Code Division Multiple Access (CDMA) Radio Access Network (RAN), the method comprising:
  maintaining a set of soft handover parameters for each of a plurality of radio configurations associated with the CDMA RAN to form a plurality of sets of soft handover parameters;
  receiving a notification of a chosen one of the plurality of radio configurations chosen for operation by the wireless communication unit; and
  transferring a first one of the plurality of sets of soft handover parameters corresponding to the selected one of the plurality of radio configurations to the wireless communication unit.

9. A method in accordance with claim 8, further comprising:
  receiving a notification of a chosen different one of the plurality of radio configurations chosen for operation by the wireless communication unit; and
  transferring a second one of the plurality of sets of soft handover parameters corresponding to the chosen different one of the plurality of radio configurations to the wireless communication unit.

10. A method in accordance with claim 9, further comprising:
  receiving a notification of an additional chosen different one of the plurality of radio configurations chosen for operation by the wireless communication unit; and
  transferring a third one of the plurality of sets of soft handover parameters corresponding to the additional chosen different one of the plurality of radio configurations to the wireless communication unit.

11. A method in accordance with claim 8, wherein the first one of the plurality of sets of handoff parameters includes one or more of: a T_ADD threshold, a T_DROP threshold, a T_COMP threshold a T_TDROP threshold, a SOFT_SLOPE threshold, an ADD_INTERCEPT threshold, and a DROP_INTERCEPT threshold.

12. A method in accordance with claim 9, wherein the second one of the plurality of sets of handoff parameters includes one or more of: a T_ADD threshold, a T_DROP threshold, a T_COMP threshold a T_TDROP threshold, a SOFT_SLOPE threshold, an ADD_INTERCEPT threshold, and a DROP_INTERCEPT threshold.

13. A method in accordance with claim 8, wherein the CDMA RAN includes a CDMA 2000 RAN.

14. An apparatus for facilitating a handoff of a call including a wireless communication unit in a Code Division Multiple Access (CDMA) Radio Access Network (RAN), the apparatus comprising:
  an RF interface communicatively coupled to the CDMA RAN;
  a memory; and
  a processor communicatively coupled to the memory and the RF interface, the processor configured to:
    maintain a set of soft handover parameters for each of a plurality of radio configurations associated with the CDMA RAN to form a plurality of sets of soft handover parameters;
    receive a notification over the RF interface of a chosen one of the plurality of radio configurations chosen for operation by the wireless communication unit; and
    transfer a first one of the plurality of sets of soft handover parameters corresponding to the selected one of the plurality of radio configurations to the wireless communication unit over the RF interface.

15. An apparatus in accordance with claim 14, wherein the first one of the plurality of sets of handoff parameters includes one or more of: a T_ADD threshold, a T_DROP threshold, a T_COMP threshold a T_TDROP threshold, a SOFT_SLOPE threshold, an ADD_INTERCEPT threshold, and a DROP_INTERCEPT threshold.

16. An apparatus for facilitating a handoff of a call including a wireless communication unit in a Code Division Multiple Access (CDMA) Radio Access Network (RAN), the apparatus comprising:
  an RF interface communicatively coupled to the CDMA RAN;
  a memory; and
  a processor communicatively coupled to the memory and the RF interface, the processor configured to:
    maintain a set of soft handover parameters for each of a plurality of radio configurations associated with the CDMA RAN to form a plurality of sets of soft handover parameters;
    receive a notification over the RF interface of a chosen different one of the plurality of radio configurations chosen for operation by the wireless communication unit; and
    transfer a second one of the plurality of sets of soft handover parameters corresponding to the chosen different one of the plurality of radio configurations to the wireless communication unit over the RF interface.

17. An apparatus in accordance with claim 16, wherein the processor is further configured to:
  receive a notification over the RF interface of an additional chosen different one of the plurality of radio configurations chosen for operation by the wireless communication unit; and
  transfer a third one of the plurality of sets of soft handover parameters corresponding to the additional chosen different one of the plurality of radio configurations to the wireless communication unit over the RF interface.

18. An apparatus in accordance with claim 16, wherein the second one of the plurality of sets of handoff parameters includes one or more of: a T_ADD threshold, a T_DROP threshold, a T_COMP threshold, a T_TDROP threshold, a SOFT_SLOPE threshold, an ADD_INTERCEPT threshold, and a DROP_INTERCEPT threshold.

* * * * *